United States Patent
Albrecht

(10) Patent No.: US 8,323,152 B2
(45) Date of Patent: Dec. 4, 2012

(54) METHOD FOR AUTOMATIC SHUTDOWN OF AN INTERNAL COMBUSTION ENGINE

(75) Inventor: Marc Albrecht, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/151,695

(22) Filed: Jun. 2, 2011

(65) Prior Publication Data

US 2011/0230309 A1 Sep. 22, 2011

Related U.S. Application Data

(63) Continuation of application No. PCT/EP2009/008305, filed on Nov. 21, 2009.

(30) Foreign Application Priority Data

Dec. 3, 2008 (DE) .......................... 10 2008 060 350

(51) Int. Cl.
*B60W 10/18* (2012.01)
(52) U.S. Cl. ....................................................... 477/184
(58) Field of Classification Search ............... 477/189, 477/194, 199, 200, 203, 204, 206, 210, 211
See application file for complete search history.

(56) References Cited

U.S. PATENT DOCUMENTS

| | | | |
|---|---|---|---|
| 4,630,577 A | 12/1986 | Cornacchia | |
| 6,135,920 A | 10/2000 | Kamiya et al. | |
| 6,275,759 B1 * | 8/2001 | Nakajima et al. | 701/54 |
| 6,466,860 B2 | 10/2002 | Kaneko | |
| 6,504,259 B1 | 1/2003 | Kuroda et al. | |
| 6,540,644 B2 | 4/2003 | Morimoto et al. | |
| 6,676,565 B2 * | 1/2004 | Mizutani | 477/111 |
| 6,730,000 B1 * | 5/2004 | Leising et al. | 477/110 |
| 7,041,030 B2 | 5/2006 | Kuroda et al. | |
| 7,458,353 B2 | 12/2008 | Takahashi | |
| 7,530,434 B2 | 5/2009 | Bitter | |
| 7,678,021 B2 | 3/2010 | Baur et al. | |
| 7,941,252 B2 * | 5/2011 | Medema et al. | 701/19 |
| 2001/0013701 A1 | 8/2001 | Onoyama et al. | |

(Continued)

FOREIGN PATENT DOCUMENTS

DE 100 23 331 A1 6/2001

(Continued)

OTHER PUBLICATIONS

International Search Report dated Mar. 10, 2010 with English translation (four (4) pages).

(Continued)

*Primary Examiner* — David D Le
*Assistant Examiner* — David J Hlavka
(74) *Attorney, Agent, or Firm* — Crowell & Moring LLP

(57) ABSTRACT

A method is provided for automatic shutdown of an internal combustion engine in a motor vehicle, in particular in a vehicle having an automatic transmission, by way of a stop-start unit which automatically shuts down the internal combustion engine when the vehicle is decelerated to a standstill and kept at a standstill by operation of the brake pedal for a predetermined interval of time. Within the predetermined interval of time, the driver is given an opportunity to prevent the automatic shutdown. According to the invention, an automatic shutdown is prevented when the driver of the vehicle depresses the brake pedal fully within the predetermined interval of time and then releases the brake pedal again.

10 Claims, 1 Drawing Sheet

U.S. PATENT DOCUMENTS

| | | |
|---|---|---|
| 2003/0004635 A1 | 1/2003 | Kamiya et al. |
| 2003/0135321 A1 | 7/2003 | Kumazaki et al. |
| 2003/0173124 A1 | 9/2003 | Okada et al. |
| 2004/0153235 A1 | 8/2004 | Kataoka et al. |
| 2005/0143901 A1 | 6/2005 | Scholt et al. |
| 2006/0142928 A1 | 6/2006 | Yuya et al. |
| 2006/0186738 A1 | 8/2006 | Noguchi et al. |
| 2007/0000712 A1 | 1/2007 | Kamiya |
| 2007/0054773 A1 | 3/2007 | Braun et al. |
| 2007/0199745 A1 | 8/2007 | Hayashi |
| 2008/0201064 A1 | 8/2008 | DiGonis |
| 2009/0138184 A1 | 5/2009 | Terada |
| 2009/0319161 A1 | 12/2009 | Abendroth |
| 2010/0076656 A1 | 3/2010 | Hiyoshi et al. |
| 2010/0114461 A1 | 5/2010 | Gibson |

FOREIGN PATENT DOCUMENTS

| | | |
|---|---|---|
| DE | 102 11 466 C1 | 8/2003 |
| DE | 102 11 463 B3 | 1/2004 |
| DE | 10 2006 028 336 A1 | 12/2006 |
| DE | 10 2007 010 488 A1 | 9/2008 |
| EP | 0 158 605 A1 | 10/1985 |
| EP | 1 469 195 A1 | 10/2004 |
| EP | 1 553 189 A1 | 7/2005 |
| EP | 1 612 408 A1 | 1/2006 |
| GB | 2 427 440 A | 12/2006 |
| JP | 2000-2129 A | 1/2000 |
| JP | 2004-183519 A | 7/2004 |
| WO | WO2004/091961 | 10/2004 |

OTHER PUBLICATIONS

German Search Report dated Oct. 27, 2009 with partial English translation (nine (9) pages).

* cited by examiner

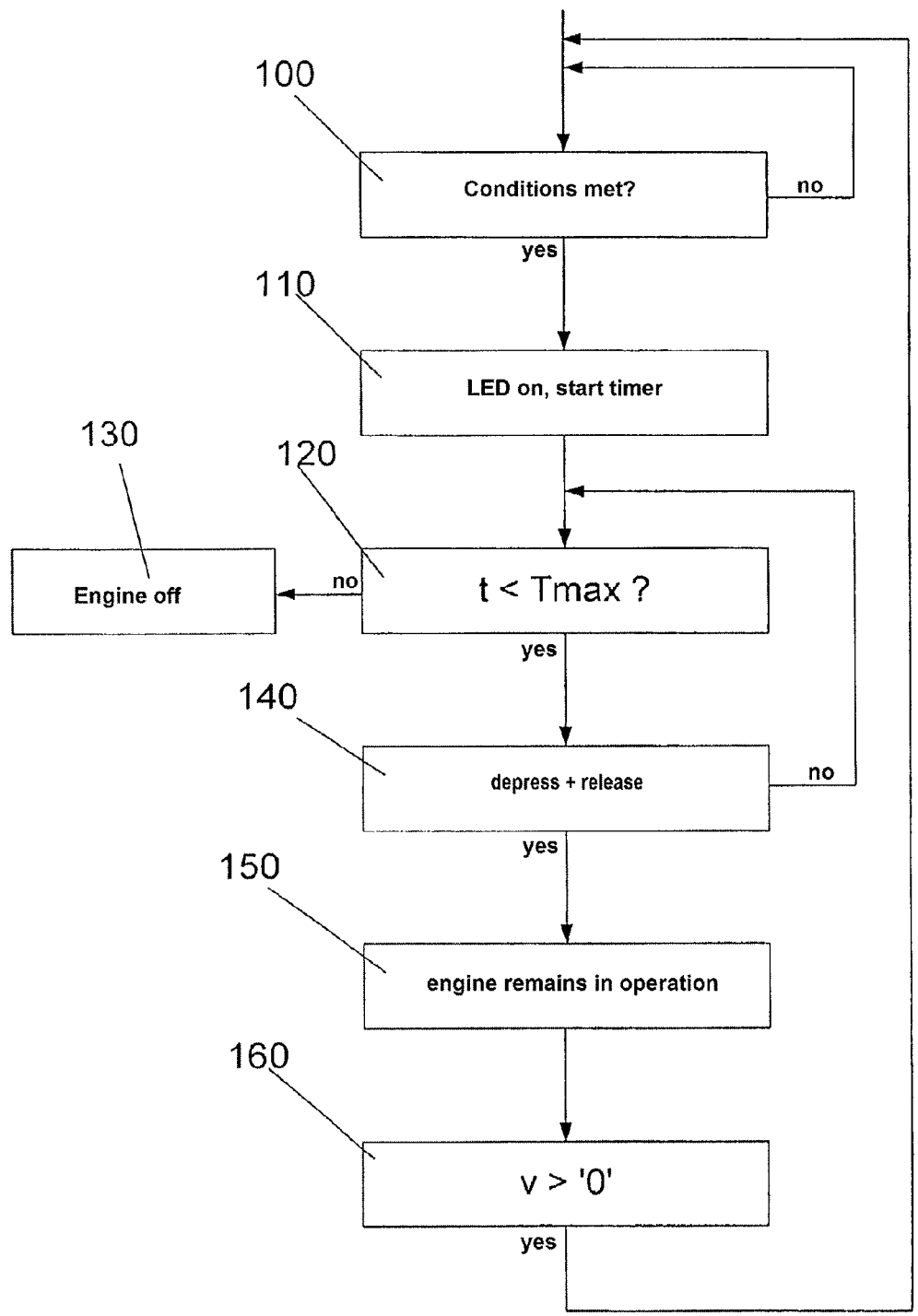

METHOD FOR AUTOMATIC SHUTDOWN OF AN INTERNAL COMBUSTION ENGINE

CROSS-REFERENCE TO RELATED APPLICATIONS

This application is a continuation of PCT International Application No. PCT/EP2009/008305, filed Nov. 21, 2009, which claims priority under 35 U.S.C. §119 from German Patent Application No. DE 10 2008 060 350.3, filed Dec. 3, 2008, the entire disclosures of which are herein expressly incorporated by reference.

BACKGROUND AND SUMMARY OF THE INVENTION

The invention relates to a method for automatic shutdown of an internal combustion engine in a motor vehicle, in particular in a motor vehicle having an automatic transmission, by way of a start-stop unit automatically switching-off the internal combustion engine when the vehicle is braked to a stop and is held at the stop for a predetermined time interval by pressing the brake pedal.

At the present time, internal combustion engines are usually shut down manually by the driver using an ignition key. One exception is a method presented in DE 100 23 331 A1, where instead of the ignition key, the brake pedal position and/or the brake pedal pressure is analyzed. The shutdown operation of the internal combustion engine is initiated when, after the vehicle reaches a standstill (stop), the brake pedal is operated more strongly in the position in which it has already been operated. One disadvantage of such a method is that only the vehicle driver is responsible for the shutdown of the internal combustion engine. Analyses of today's driving performance have shown that despite an increased environmental consciousness and rising fuel prices, manual shutdown of the internal combustion engine, e.g., at traffic lights is rarely done independently.

To reduce fuel consumption and pollution emissions, methods and systems are currently being developed (and to some extent have already been implemented) in which the internal combustion engine of a motor vehicle is automatically shut down under certain conditions and/or when predetermined shutdown conditions prevail and the engine is automatically started again when predetermined startup conditions prevail. Such methods and systems and/or stop-start devices are suitable in particular for city traffic to reduce fuel consumption. This is because in city traffic a vehicle will often come to a standstill at traffic lights or because of traffic, and operation of the internal combustion engine is not necessary then.

For example, a device which causes a shutdown and/or a renewed startup of the internal combustion engine depending on various conditions is known from EP 0 158 605 B1. One condition for initiating an automatic shutdown procedure is, for example, that the vehicle speed must be below a limiting value for a certain period of time before the internal combustion engine is automatically shut down.

One disadvantage of such methods and devices is that the current traffic situation cannot be taken into account. Consequently, the internal combustion engine is also shut down in situations in which the driver does not desire to do so for comfort reasons. For example, it would not be desirable to have automatic shutdown of the internal combustion engine at a turn lane or at a stop sign, where there is the option of continuing to drive immediately. In particular in the case of vehicles with automatic transmissions, under the prerequisite that the internal combustion engine is automatically shut down in braking to a standstill, the driver cannot prevent an automatic shutdown operation. If an inexpensive pinion starter is used as a starting system, then a lane change, i.e., starting the internal combustion engine while the vehicle is moving is impossible or is associated with a loss of convenience because the pinion starter can, in principle, make a lane change again only when the internal combustion engine is completely shut down. This also results in longer starting times under some circumstances.

To overcome this problem, methods and systems in which the driver can prevent an automatic shutdown are already known. EP 1 469 195 B1 thus discloses a method for automatic shutdown of an internal combustion engine in a vehicle in which the driver can prevent the automatic shutdown operation within a predetermined interval of time after reaching a standstill. For example, the automatic shutdown operation is not initiated when the driver steps on the brake pedal to a greater extent within the predetermined interval of time after reaching a standstill.

The object of the invention is to provide an alternative method for automatic shutdown of an internal combustion engine in a vehicle with or without an automatic transmission, to enable the driver to prevent the automatic shutdown operation in a simple and intuitive manner when decelerating the vehicle to shutdown.

This and other objects are achieved by a method according to the invention for automatic shutdown of an internal combustion engine in a motor vehicle (preferably in a motor vehicle having an automatic transmission) by way of a start-stop device. The method is, in principle, designed so that the internal combustion engine shuts down automatically when the vehicle is decelerated to a standstill (in addition to the other shutdown conditions, which are predetermined and have been met) and has been kept at a standstill by operation of the brake pedal for a predetermined interval of time. Within the predetermined interval of time after reaching a standstill, the driver is given an opportunity to prevent the automatic shutdown. The automatic shutdown should be prevented if the driver recognizes that continued driving is directly imminent.

In contrast with the prior art cited above, the present invention is characterized in that the automatic shutdown operation is not suppressed as soon as the driver depresses the brake pedal fully, but instead only when he has released it again at least somewhat after depressing it fully, i.e., instead of assessing the pressure buildup, the torque buildup, or the brake pedal distance traveled when the brake pedal is fully depressed as being the trigger for preventing the automatic shutdown operation of the internal combustion engine, only the subsequent pressure buildup, torque buildup or the brake pedal distance traveled in the subsequent release of the brake is assessed as being this trigger. This should prevent the automatic shutdown operation from already being suppressed when the driver only inadvertently depresses the brake pedal or his foot passes over it in deceleration to a standstill and the driver by no means intends to prevent the shutdown operation. Only the release of the brake pedal from the fully depressed state is evaluated as being a command to prevent the automatic shutdown operation.

This method is advantageous in particular for vehicles having automatic transmissions because the driver usually leaves the gearshift lever in the normal position during a vehicle standstill and there is no clutch pedal that could be interpreted with regard to the driver's intent. The "automatic transmission" concept includes, in addition to the traditional automatic transmissions, all the at least partially automated transmissions, including double-clutch transmissions (transmissions with and without transducers, EGS, SMG). However, this method may also be used in vehicles having a manual transmission. The start-stop device may be, for example, an independent control unit or may be integrated into the engine control unit.

Automatic shutdown of the internal combustion engine is advantageously prevented only when the brake pedal is released again after having been depressed fully at least by a predetermined amount. For example, the brake pedal position, the brake torque that has built up, or the braking force generated may be analyzed. Accordingly, automatic shutdown of the internal combustion engine is interrupted only when the brake pedal, after being fully depressed, is released until reaching the original actuated brake pedal position prior to the increased depression and/or until reaching the original braking force or the original braking torque prior to the increased depression. It is thus possible to ensure that the driver's intent to prevent the automatic shutdown operation will be reliably detected.

The driver of the vehicle may advantageously be informed by way of a display element as soon as he is able to prevent automatic shutdown of the internal combustion engine. If the predetermined operating conditions are met, an LED lights up, for example, signaling to the driver that the internal combustion engine will soon be shut down by the stop-start unit. As a display element, however, loudspeakers for an acoustic element or other elements for visual or haptic signals may also be used. Starting at this point-in-time the driver of the vehicle is able to prevent the internal combustion engine from being shut down.

Other objects, advantages and novel features of the present invention will become apparent from the following detailed description of one or more preferred embodiments when considered in conjunction with the accompanying drawing.

BRIEF DESCRIPTION OF THE DRAWING

The sole FIGURE is a simplified flow chart illustrating an exemplary method according to the invention in a motor vehicle having an automatic transmission.

DETAILED DESCRIPTION OF THE DRAWING

The method for automatic shutdown of an internal combustion engine is integrated into a stop-start unit or into a control unit. In a first step 100, all the conditions (operating conditions and accessory conditions) which are necessary for automatic shutdown of the internal combustion engine are polled. This may be, for example, the vehicle speed which must be approximately zero (standstill of the vehicle), the rotational speed, which must be below a predetermined limiting value, and the brake pedal, which must be operated. These conditions are queried during the entire procedure. Only when all conditions are met is the method performed further. Otherwise it is terminated and the method begins again.

If all the conditions are met, then in a second step 110 an LED is turned on as a display element. This notifies the driver of the vehicle that the internal combustion engine will be shut down after a predetermined period of time unless he prevents it. At the same time in step 110 a timer is started, monitoring time t.

Then, in a next step 120, elapsed time t is queried. As soon as elapsed time t is within the predetermined interval of time tmax, then in a next step 140, the system monitors the brake pedal for whether it is fully depressed and then released back to its original position before being depressed fully. To do so, for example, the brake pedal distance, the braking pressure and/or the braking torque may be analyzed. If full brake pedal depression and subsequent release are not detected, then the system jumps back to step 120 and time monitoring is repeated. If elapsed time t is greater than elapsed interval of time tmax, then in step 130 the internal combustion engine is automatically shut down.

However, if overpressure and then release of the brake pedal to the original starting position are detected in step 140, this is the signal that, in the next step 150, the automatic shutdown of the internal combustion engine will be prevented and the internal combustion engine will remain in operation. The method does not begin anew until the accelerator has been depressed in the last step 160 and the vehicle speed has increased to more than approximately zero again.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a motor vehicle having an internal combustion engine and a start-stop unit, the start-stop unit being configured to automatically shut down the internal combustion engine when the motor vehicle is braked to a standstill and is held at the standstill for a predetermined time interval by operation of a brake pedal, the method comprising the acts of:

monitoring the predetermined time interval after which the start-stop unit will automatically shut down the internal combustion engine when the vehicle is braked to the standstill and is maintained in the standstill for the predetermined time interval by operation of the brake pedal;

detecting, after reaching the standstill, whether the brake pedal is depressed to a greater extent than that to maintain the standstill detecting, in the event the brake pedal is depressed to the greater extent, whether the brake pedal is subsequently released from being depressed to the greater extent within the predetermined interval of time; and preventing the automatic shutdown of the internal combustion engine in the event the brake pedal is depressed to the greater extent, and then is subsequently released from being depressed to the greater extent within the predetermined interval of time, even though the motor vehicle continues to be maintained at the standstill by operation of the brake pedal.

2. The method according to claim 1, wherein the act of preventing is carried out when the brake pedal, after being depressed to the greater extent, is released until reaching an original brake pedal position previously used to maintain the vehicle at the standstill.

3. The method according to claim 1, wherein the preventing act occurs when the brake pedal is released after being depressed to the greater extent at least until reaching an original braking force or original braking torque that was previously applied to maintain the vehicle at the standstill.

4. The method according to claim 1, further comprising the act of:

providing an indication for a driver of the motor vehicle that the automatic shutdown of the internal combustion engine is preventable.

5. The method according to claim 1, wherein the motor vehicle is equipped with an automatic transmission.

6. A method of operating a motor vehicle with an internal combustion engine and a start-stop unit for automatically shutting down the internal combustion engine under certain conditions, the method comprising the acts of:

detecting predefined operation conditions of the motor vehicle in which the automatic shutdown of the internal combustion engine will occur within a predetermined period of time, one operating condition being an operation of the brake pedal at least until the motor vehicle reaches a standstill; and preventing the automatic shutdown of the internal combustion engine upon detecting an increased depression of the brake pedal beyond that used to maintain the motor vehicle at the standstill, and then a subsequent release from the increased depression within the predetermined interval of time, even though the motor vehicle continues to be maintained at the standstill by operation of the brake pedal.

7. The method according to claim 6, wherein the subsequent release of the brake pedal is determined by a release of the brake pedal to the brake pedal position originally used to maintain the vehicle at the standstill.

8. The method according to claim 6, further comprising the act of:

signaling to a driver of the vehicle that the automatic shutdown of the internal combustion engine is preventable.

9. A system for automatic shutdown of an internal combustion engine in a motor vehicle, the system comprising:

a start-stop unit for automatically shutting down the internal combustion engine when the motor vehicle is braked to a stop and is held at the stop for a predetermined time interval by operation of a brake pedal; and wherein the start-stop unit is operatively configured to prevent the automatic shutdown of the internal combustion engine, even though the motor vehicle continues to be maintained at the standstill by operation of the brake pedal, upon detecting an increased depression of the brake pedal beyond a brake pedal position used to maintain the vehicle at the stop, followed by a subsequent release of the brake pedal from the increased depression, both the increased depression and subsequent release occurring within the predetermined time interval.

10. The system according to claim 9, further comprising a display operatively coupled with the start-stop unit to provide a signal to a driver of the motor vehicle that the automatic shutdown of the internal combustion engine is preventable.

\* \* \* \* \*